United States Patent [19]
Lai

[11] Patent Number: 5,339,009
[45] Date of Patent: Aug. 16, 1994

[54] METHOD AND APPARATUS FOR DISTINGUISHING INPUT SIGNALS AND GENERATING A COMMON DIMMING SIGNAL

[75] Inventor: Henry Lai, Bloomfield, Mich.

[73] Assignee: Ford Motor Company, Dearborn, Mich.

[21] Appl. No.: 904,717

[22] Filed: Jun. 25, 1992

Related U.S. Application Data

[63] Continuation-in-part of Ser. No. 742,247, Aug. 8, 1991, abandoned.

[51] Int. Cl.⁵ ............................................. G05F 1/00
[52] U.S. Cl. ................................. 315/291; 315/77; 315/DIG. 4; 307/10.8
[58] Field of Search .................. 315/291, 77, 293, 307, 315/DIG. 4, 297, 151, 158, 156, 159; 307/10.7, 10.8

[56] References Cited

U.S. PATENT DOCUMENTS

| | | | |
|---|---|---|---|
| 3,968,401 | 7/1976 | Bryant | 315/293 |
| 3,968,477 | 7/1976 | Sumida et al. | 340/167 |
| 3,970,893 | 7/1976 | Bryant | 315/293 |
| 4,321,509 | 3/1982 | Miyaji et al. | 315/291 |
| 4,358,713 | 11/1982 | Senoo et al. | 315/291 |
| 4,358,714 | 11/1982 | Sechler et al. | 315/291 |
| 4,368,406 | 1/1983 | Kruzich et al. | 315/158 |
| 4,661,717 | 4/1987 | Nishioka | 307/10 |
| 4,891,828 | 1/1990 | Kawazoe | 377/114 |
| 4,968,917 | 11/1990 | Harris | 315/77 |
| 5,268,616 | 12/1993 | Dean et al. | 315/77 |
| 5,277,497 | 1/1994 | Enomoto | 315/DIG. 4 |

FOREIGN PATENT DOCUMENTS

| | | | |
|---|---|---|---|
| 521186A | 1/1993 | Japan | 315/77 |

*Primary Examiner*—Robert J. Pascal
*Assistant Examiner*—Tan Dinh
*Attorney, Agent, or Firm*—Roger L. May; Mark L. Mollon

[57] ABSTRACT

Provided is a method and apparatus for statistically distinguishing input signals on the lamp lines of an instrument panel dimming circuit to generate a common dimming signal. The method and apparatus sample input signals to statistically determine the waveform of the input signal, i.e., direct current or pulse wide modulated signals thus obviating the need for trapping jumpers and associated electronics which require additional assembly time and manufacturing costs.

8 Claims, 5 Drawing Sheets

| COUPLE INPUT SIGNAL TO THE CONTROL CIRCUIT AND GENERATE AN OUTPUT SIGNAL THAT CORRESPONDS TO THE INPUT SIGNAL |

↓

| PROTECT HIGH VOLTAGE INPUTS AND FILTER NOISE |

↓

| SAMPLE THE OUTPUT SIGNAL TO STATISTICALLY DETERMINE THE WAVEFORM OF THE INPUT SIGNAL |

↓

| ADJUST AMPLITUDE OF OUTPUT SIGNAL |

Fig-7

METHOD AND APPARATUS FOR DISTINGUISHING INPUT SIGNALS AND GENERATING A COMMON DIMMING SIGNAL

CROSS-REFERENCE TO RELATED APPLICATIONS

This is a continuation-in-part of copending application Ser. No. 742,247, filed Aug. 8, 1991, and now abandoned.

TECHNICAL FIELD

The present invention relates to dimmers, and more particularly to a method and apparatus for statistically sensing input signals on the lamp lines of an instrument panel dimming circuit and generating a common dimming signal.

BACKGROUND OF THE INVENTION

Automobiles and other vehicles are generally provided with electronic indicating panels on dashboards and the like which are controlled by driving circuits. These vehicles are similarly equipped with audio systems which have respective electronic indicators used for tuning, station identification, volume control and similar adjustments by the user.

These electronic indicators have typically been provided with means to adjust the intensity of the illuminating lamp or lamps in accordance with the ambient lighting conditions, the running condition of the vehicle and the user preferences. For example, when the vehicle is being operated in areas of high external illumination such as in urban districts, it may be desirable to increase the intensity of illumination of the illuminating lamp or lamps, so that the visibility of instruments may be increased. Similarly, when the vehicle is operated on less frequently travelled routes, it may be desirable to decrease the intensity of illumination of the illuminating lamp or lamps to prevent distraction or fatigue to the operator or user.

Several prior art devices have been developed which permit a vehicle operator to control the intensity of illumination of indicator lights based on specific input signals.

U.S. Pat. No. 4,968,917 issued to Harris discloses an electronic dimmer circuit that controls the brightness level of a display device. The Harris patent is specifically directed to the manipulation of output dimming signals. In Harris, a rheostat is used to control the brightness level. In doing so, two dimming reference voltages are generated, LR1 and LR2, with the difference between the two voltages defining an acceptable voltage window. Using a D-to-A converter/microprocessor feedback system, the Harris circuit senses the output of the D-to-A converter and determines if the voltage level falls within the window. If so, an appropriate dimming signal is sent to the driver display which controls the brightness of the display. If the D-to-A signal does not fall within the window, the microprocessor steps down the D-to-A output until the signal falls within the window. Harris' circuit, unlike the present invention, does not engage in statistical analysis, but instead senses the logic condition of a dimming output signal and adjusts the signal level so as to fall into a certain acceptable voltage window corresponding to a certain level of brightness.

U.S. Pat. No. 4,368,406 issued to Kruzich, et al., discloses a lamp dimmer control utilizing a variable resistor and an associated adjustment mechanism having an ambient light sensor. As disclosed by Kruzich, the sensor is mounted integral to the control so as to receive ambient light external to the control housing through a translucent adjustment mechanism. The sensor is utilized in conjunction with the variable resistor to provide information to pulse width modulation circuitry and to maintain a relatively constant illumination contrast with respect to the ambient light levels.

U.S. Pat. No. 4,321,509 issued to Miyaji, et al., also discloses a dimmer to control the intensity of illumination of a lamp or lamps for illuminating an instrument panel. Miyaji further discloses the use of sensing means comprising a varistor to sense and absorb undesirable surge voltages. In operation, the surge voltage sensor acts to shut off a dimming transistor to prevent transmission of high currents which may damage the dimmer.

U.S. Pat. No. 4,891,828 issued to Kawazoe discloses a voltage to pulse-width conversion circuit for adjusting the brightness of electronic indicating devices. As disclosed by Kawazoe, the voltage to pulse-width conversion circuit converts a PWM input signal into a PWM output signal having a predetermined duty ratio. The circuit comprises a counter which counts a reference frequency signal to produce a multi-bit digital value, a digital/analog converter (D/A converter) which converts the digital value into an analog signal, and a voltage comparator which compares the analog output signal of the D/A converter with a control signal for pulse-width modulation to produce a modulated output signal which has a predetermined duty ratio. As disclosed, Kawazoe's circuit is utilized to increase the accuracy of the PWM output signal and thus permit the use of smaller integrated chips.

U.S. Pat. No. 4,358,713 issued to Senoo, et al., discloses a brightness control device for the light emitting display of an automotive vehicle electronic meter. According to Senoo, the brightness of the display is controlled in response to an output pulse signal (having a variable duty factor) produced by an illumination controller. The apparatus disclosed by Senoo permits the brightness of the light emitting display to be properly controlled in response to the ambient light level so as to increase visibility of the display during the day and at night.

U.S. Pat. No. 4,661,717 issued to Nishioka discloses a load condition determining apparatus to determine normal and abnormal conditions of a load circuit. In operation, the apparatus supervises or monitors operating conditions of different lights and lamps, such as headlights, tail lamps and brake lamps and to detect any abnormal conditions such as any short circuit or disconnection of the lights and lamps.

U.S. Pat. No. 4,358,714 issued to Sechler, et al., discloses a light dimming system for simultaneously controlling the brightness of a plurality of two-terminal indicating lights, each having one terminal connected to receive a constant voltage relative to ground. This voltage is arbitrarily variable between predetermined high and low values, to control the intensity of a light connected between the output of the dimmer apparatus and a constant voltage source.

The conventional prior art devices discussed above provide a general background with respect to the control and application of dimming circuits. Significantly, each of the devices operate according to specific input information. These conventional dimming devices therefore suffer from lack of interchangeability in that they are source specific and will only operate in response to particular input unless modified accordingly.

While interchangeability may not have been a significant issue in the past, our new global economy now dictates the use of standard parts which may be interchanged as necessary for use in different applications at multiple manufacturing facilities.

For example, audio systems which are required to be installed in different model automobiles have previously utilized general dimming circuits which must be individually modified prior to installation. More specifically, these prior art systems require modification so as to receive and operate according to the different input signals provided on the lamp lines of the applicable automobile dimming circuits.

For example, in the case of domestic automobiles, a DC (direct current) voltage in the range 0 to 14 volts is typically supplied on the lamp supply line, and the lamp return line is grounded. In contrast, foreign manufactured automobiles have generally utilized pulse-width modulated (PWM) input signals in the range 0 to 14 volts. These automobiles may supply an input signal on the lamp supply line with the lamp return line grounded. Alternatively, a voltage input may be provided on both the lamp return line and the lamp supply line.

As set forth above, conventional dimming circuits require modification when used in different vehicles to operate in accordance with the desired input. Typically, these modifications include the installation or removal of trapping jumpers and related electronics. As readily seen, this approach requires additional assembly time, training, testing and associated costs.

SUMMARY OF THE INVENTION

It is an object of the present invention to overcome the problems of the prior art systems by providing an interchangeable dimming circuit that is capable of statistically distinguishing different input signals on the lamp lines of an instrument panel dimming circuit, and more particularly an audio system dimming circuit to generate a common dimming signal. This dimming signal is then utilized to set the corresponding dimming level. As disclosed herein, the present invention significantly reduces assembly time and avoids the parts and labor costs associated with the prior art systems by obviating the need for modifications at the assembly end. Trapping jumpers and related electronics inherent in prior art designs are rendered unnecessary by the present invention.

In carrying out the above object, two preferred embodiments of the present invention are disclosed.

The first embodiment comprises a voltage divider or similar voltage divider means in electrical contact with the lamp supply and lamp return lines of an audio system dimming circuit. The voltage divider operates to receive different input signals and generate a differential voltage between the lamp lines. A differential amplifier or other amplifier means in electrical contact with the voltage divider acts to receive the differential voltage and generate a proportional output signal using the ground potential of the control circuit as a reference. This output signal is then input to a microcontroller whose function is described below.

The second embodiment of the present invention comprises an optoisolator in electrical contact with the lamp supply and return lines. The optoisolator acts to isolate the lamp input signals and ensures that the control circuit is protected from signal noise. This optical device replaces the operational amplifier in the first embodiment and eliminates the need to differentiate between the two types of PWM signals. Instead the optoisolator distinguishes between DC and PWM signals and generates an output signal to be input to a microcontroller.

The microcontroller in both embodiments has the same functions, statistical analysis of a signal to determine the nature of the input waveform and the generation of appropriate dimming signals at the output. The microcontroller samples the signal with an analog-to-digital converter or other sampling means. By statistical analysis, the DC or PWM signal is translated into a common signal which will be referenced as the dimmer setting by the controller. The microcontroller of the present invention is also designed to adjust the amplitude of the output signal to account for different pulse amplitudes and offset voltages. The resultant dimming signal therefore has equal amplitude swings.

As set forth above, the control circuit of the present invention may be common to an entire line of audio system dimming circuits regardless of the type of input signal utilized by the receiving vehicle. The control circuit eliminates the need for additional manufacturing procedures inherent in the prior art systems which require special modifications through the use of trapping jumpers and similar electronics.

As will be more fully illustrated below, the control circuit and method of the present invention may be installed quickly and easily in conventional audio systems without the need of highly skilled labor. As a result, the capital and labor costs normally required to install the prior art systems may be substantially reduced if not eliminated.

Accordingly, a general object of the present invention is the provision of a quickly and easily installed improved control circuit for receiving and distinguishing direct current and pulse width modulated input signals on the lamp lines of an instrument panel dimming circuit and generating a common dimming signal to set the corresponding dimming level.

A more specific object in such an improved control circuit is the provision of voltage divider means in electrical contact with the lamp lines for receiving an input signal and generating a differential voltage therebetween; amplifier means in electrical contact with the voltage divider means for receiving the differential voltage and generating an output signal using the ground potential of the control circuit as a reference; and a microcontroller in electrical contact with the amplifier means for receiving and sampling the output signal to statistically determine the waveform of the input signal and generate a common dimming signal with equal amplitude swings.

Another more specific object of the present invention is a method for statistically distinguishing direct current and pulse width modulated input signals on the lamp lines of an instrument panel dimming circuit and generating a common dimming signal to set the corresponding dimming level. The method measures the differential voltage between the lamp lines; generates an output signal proportional to the differential voltage using the ground potential of the dimming circuit as a reference; samples the output signal with an analog-to-digital converter to statistically determine the waveform of the input signal; and adjusts the amplitude of the output signal according to the determined waveform through the use of microcontroller software accounting for different pulse amplitudes and offset voltages to provide a common dimming signal with equal amplitude swings.

The objects, features and advantages of the present invention are readily apparent from the following detailed description of the best mode for carrying out the invention when taken in connection with the accompanied drawings.

DESCRIPTION OF THE PREFERRED EMBODIMENTS

Figure 1:
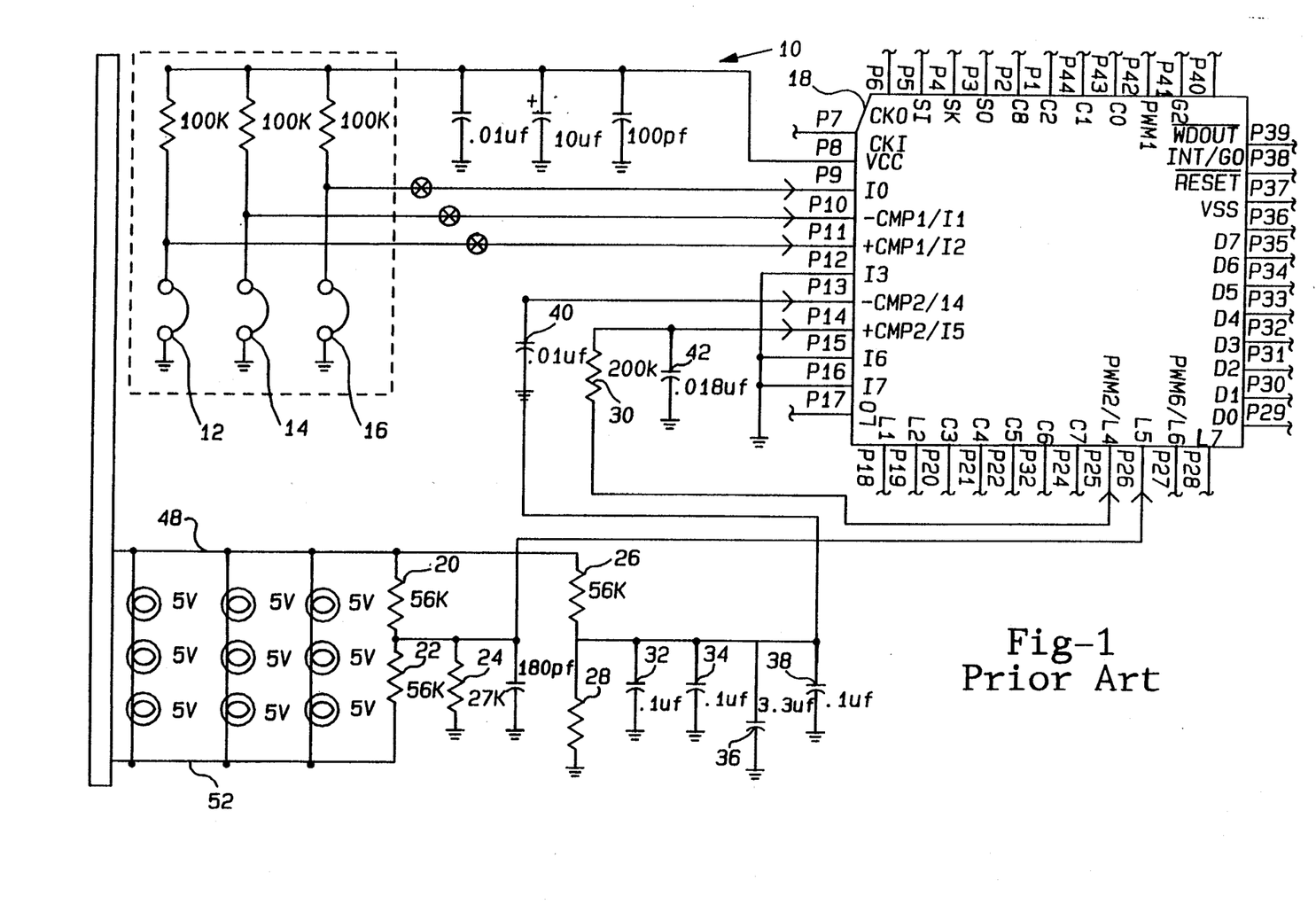
FIG. 1 is a schematic circuit diagram of a prior art audio system dimming circuit designed for installation in different vehicle models following necessary modifications.

With reference to FIG. 1 of the drawings, there is shown a prior art audio system dimming circuit indicated generally by reference numeral 10. Dimming circuit 10 accommodates option trapping jumpers 12, 14 and 16 which may be installed or removed as necessary for use in different model, foreign and domestic automobiles. Option trapping jumpers 12, 14 and 16 are shown with possible inputs to microcontroller 18 at pins P9, P10 and P11, respectively.

Dimming circuit 10 is further designed to accommodate additional components such as resistors 20, 22, 24, 26, 28 and 30 and capacitors 32, 34, 36, 38, 40 and 42. Again, depending upon the type and model automobile in which the dimming circuit is intended to be installed, these components must be added or removed to recognize and accommodate the input signal provided.

Figure 2:
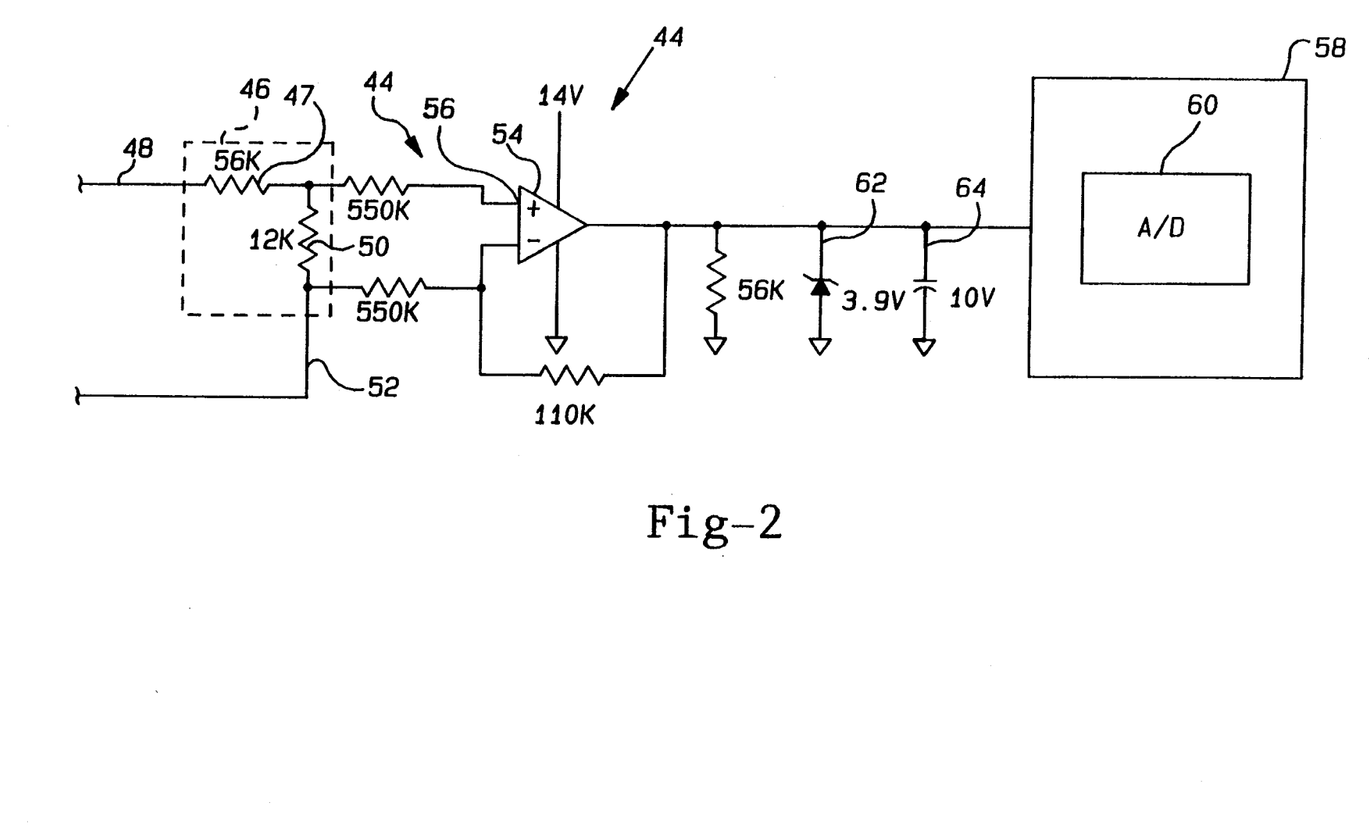
FIG. 2 is a schematic circuit diagram of a first embodiment of the control circuit of the present invention.

Referring now to FIG. 2, a first embodiment of the control circuit of the present invention is indicated generally by reference number 44. The control circuit 44 is provided with a voltage divider generally indicated by reference numeral 46. Voltage divider 46 is preferably comprised of a 56 KΩ resistor 47 connected in series with lamp supply line 48 and a 12 KΩ resistor 50 connected in series with lamp return line 52.

The differential voltage between the lamp supply line 48 and the lamp return line 52 is fed into a differential amplifier 54 at the positive terminal 56. Amplifier 54 provides an output signal proportional to the differential voltage using the ground potential of the circuit as a reference. Thus, the output of the amplifier is an absolute value. This output signal is then fed into a microcontroller 58 which samples the output signal through the use of an analog-to-digital converter 60 to distinguish the waveform of the input signals on the lamp supply line 48 and the lamp return line 52. Microcontroller 58 further generates a common dimming signal with equal amplitude swings to set the corresponding dimming level of the circuit.

Still referring to FIG. 2, it is seen that a protect means such as zener diode 62 may be placed in series with differential amplifier 54 to receive the output signal and protect the microcontroller from high voltage inputs. In the present case, the analog-to-digital converter 60 disclosed by applicant has a full scale input of 5 volts. Therefore, zener diode 62 is placed in the circuit to protect the analog-to-digital converter 60 from voltage greater than 5 volts. Similarly, a capacitor or other filter means 64 may also be placed in series with the differential amplifier 54 and/or zener diode 62 to bypass or filter unwanted noise on the input to the analog-to-digital converter 60.

Figure 3:
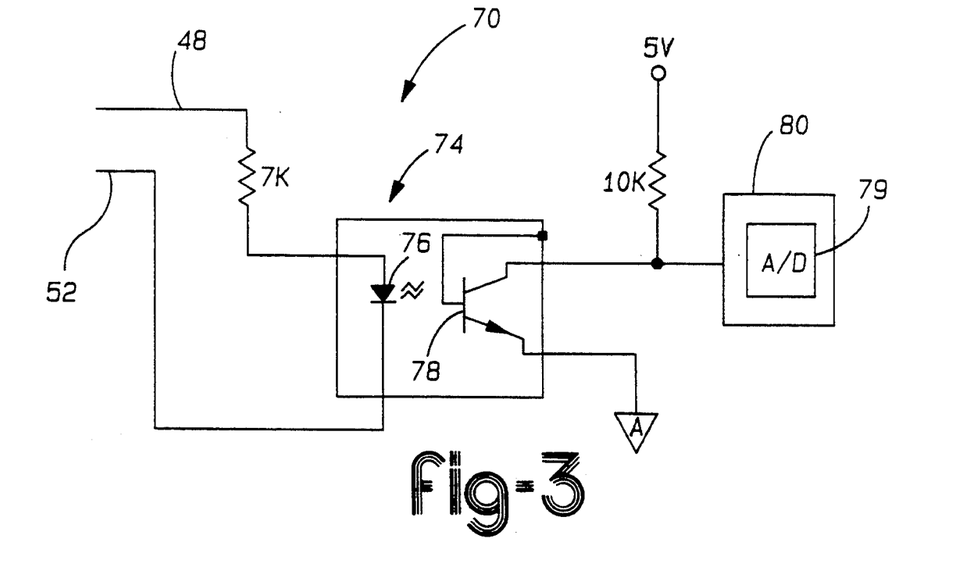
FIG. 3 is a schematic circuit diagram of a second embodiment of the control circuit of the present invention.
Figure 4:
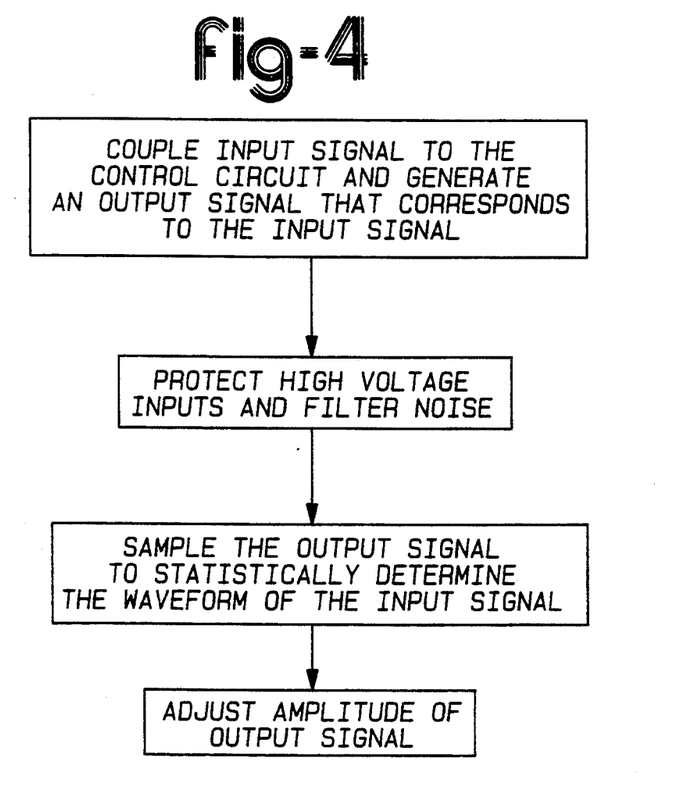
FIG. 4 is a block diagram of the method steps of the present invention.

Referring now to FIG. 3, the second embodiment of the control circuit of the present invention is indicated generally by reference number 70. The control circuit 70 includes an optoisolator generally indicated by reference numeral 74. Optoisolator 74 is preferably comprised of a light emitted diode 76 optically coupled to a npn transistor 78.

The differential voltage between the lamp supply line 48 and the lamp return line 52 is fed into the optoisolator 74. The optoisolator replaces the operational amplifier 54 in the first embodiment and acts to provide an output signal that is proportional to the differential voltage appearing between the lamp supply line 48 and the lamp return line 52. This output signal is then fed into a microcontroller 80 which samples the output signal through the use of an analog-to-digital converter 79 to distinguish the waveform of the input signals on the lamp supply line 48 and the lamp return line 52. Microcontroller 80 further generates a common dimming signal with equal amplitude swings to set the corresponding dimming level of the circuit.

Figure 7:
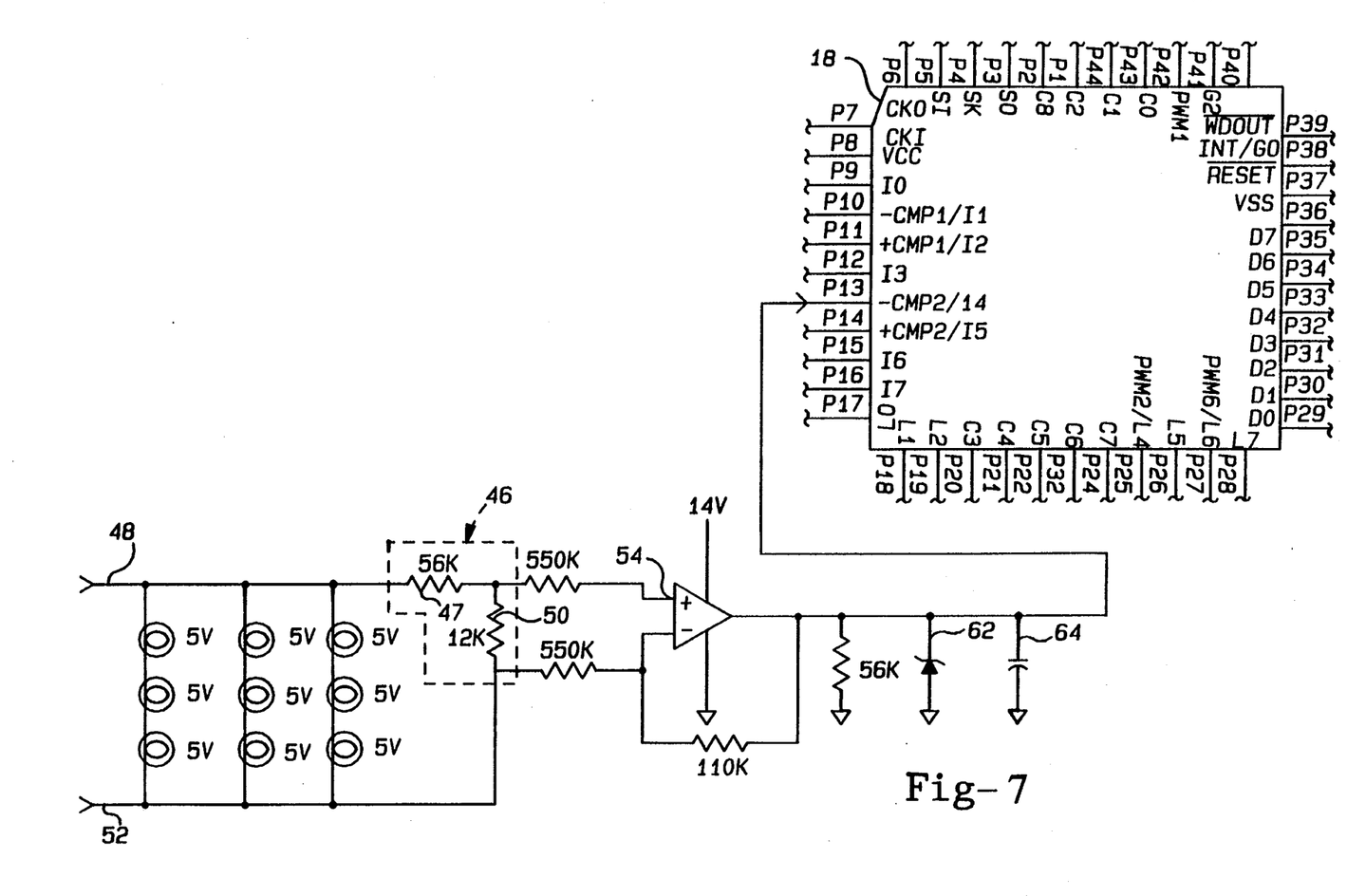
FIG. 7 is a schematic circuit diagram of the prior art audio system dimming circuit of FIG. 1 shown with the first embodiment of the control circuit of the present invention installed.

As shown in FIG. 7, control circuits 44 and 70 are designed to be implemented in and modify the prior art dimming circuits in the original manufacturing stages. Thus, control circuits 44 and 70 are designed to be connected directly to the lamp supply line 48 and the lamp return line 52. Additional electronics and trapping jumpers 12, 14 and 16 need not be installed since their use is obviated by applicant's design.

Operation

The method of operation of the control circuit of the present invention will now be described with reference to FIGS. 2 and 3.

The control circuit of the first preferred embodiment of the present invention must first measure the differential voltage between lamp lines 48 and 52. Once determined, this differential voltage is input to differential amplifier 54 which generates an output signal proportional to the differential voltage using the ground potential of the control circuit as a reference. This output signal may then be fed through a zener diode means 62 or other protect means to protect the microcontroller 58 from high voltage inputs. The signal is further be fed through a capacitor or other filter means 64 to filter any unwanted noise on the output signal.

The control circuit of the second preferred embodiment of the present invention isolates and distinguishes the differential voltage between lamp lines 48 and 52. This voltage is then input to an optoisolator 74 which generates an output proportional to the differential voltage. Unlike the first embodiment, optoisolator 74 in the second embodiment incorporates a npn transistor 78 which is regulated from a 5 V supply. Therefore, there is no need for a voltage clamping zener diode to protect the microcontroller 80 from high voltage inputs. Further, since the control circuit is optically coupled to the microprocessor 80 unwanted noise is automatically filtered out and the need for a capacitor is alleviated.

The output signal is then sampled by microcontroller 58 or 80 through the use of an analog-to-digital converter 60 or 79 or similar sampling means to statistically determine the waveform of the input signal.

Significantly, the analog-to-digital converters 60 and 79 sample the output signal at a predetermined rate. This rate is set to be no slower than the period of any pulse-width modulated signals that may be input into the control circuit. The total number of samples that the analog-to-digital converters 60 and 79 take is determined by the frequencies of the pulse-width modulated (PWM) signal of input to the control circuit. The least common multiplier of these signals is the "group sampling frequency" of the analog-to-digital converter.

In operation, analog-to-digital converters 60 and 79 sample the output signal to determine the standard voltage deviation of the signal. Significantly, applicant has found that if the standard deviation of the output signal is zero, then the input signal must, by definition, be a direct current signal. Conversely, if the standard deviation of the output signal is determined to be non-zero, then the input signal must, as a matter of course, be a pulse-width modulated signal. Based upon this statistical analysis, the proper software adjustments may then be made by the microcontroller software to account for DC offset voltages and different pulse amplitudes so that a common dimming signal with equal amplitude swings may be provided to set the corresponding dimming level of the circuit. Note that with the optical coupler of the second embodiment there is no need to distinguish between the two types of pulse-width modulated signals.

Figure 5:
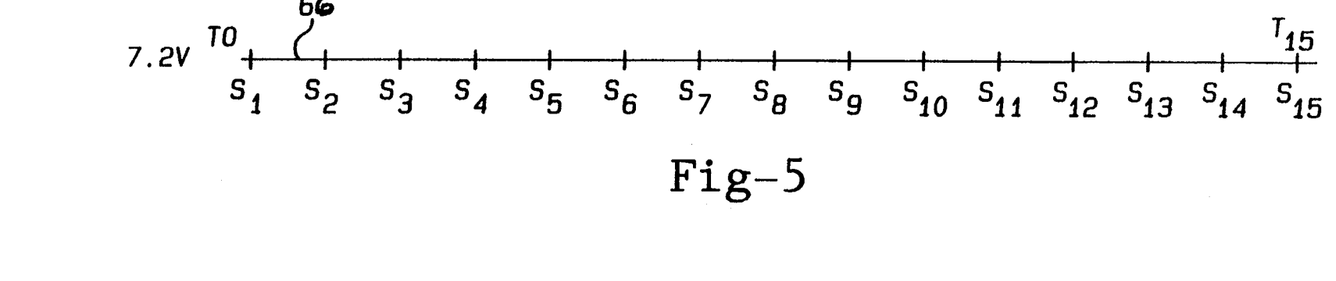
FIG. 5 is a schematic waveform diagram of a 7.2 volt direct current input signal on the lamp lines of an audio system dimming circuit as sampled by the control circuit of the present invention during equal time intervals $t_0$ to $t_{15}$.

In further example of the sampling process, reference is made to FIG. 5 which illustrates a DC voltage input of 7.2 volts on the lamp lines of an audio dimming circuit. As illustrated in FIG. 5, the waveform 66 is shown being sampled by the control circuit of the present invention during equal time intervals $t_0$ to $t_{15}$. During this time period, fifteen samples are taken, namely $S_1$ to $S_{15}$. The sum of all samples is therefore equal to $15*S_1$. Accordingly, the average voltage of the waveform is equal to $$\frac{(15)(S_1)}{15}$$

As readily seen, the average voltage is therefore $S_1$ which is 7.2 volts.

Figure 6:
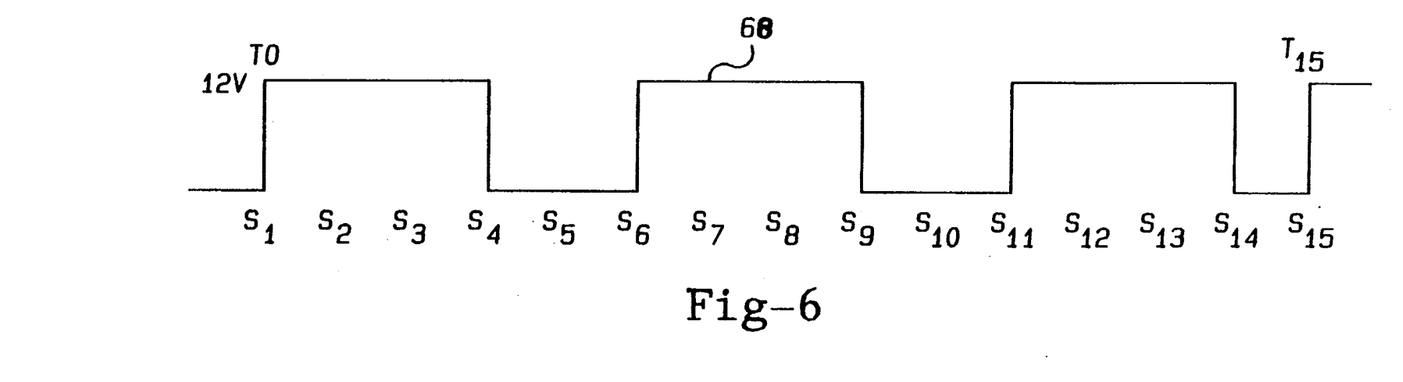
FIG. 6 is a schematic waveform diagram of a 0 to 12 volt pulse-width modulated input signal on the lamp lines of an audio system dimming circuit as sampled by the control circuit of the present invention during equal time intervals $t_0$ to $t_{15}$.

Referring now to FIG. 6, there is shown a PWM (pulse-width modulated) signal having a voltage swing from zero to twelve volts. The waveform indicated generally by reference numeral 68 is similarly shown to be sampled by the control circuit of the present invention during equal time intervals $t_0$ to $t_{15}$. Again, during this time period, 15 samples are taken, namely $S_1$ to $S_{15}$. Here, the sum of all samples is equal to 108 and the average voltage is equal to $108 \div 15$ or 7.2 volts. Although the average voltage in this example is equivalent to the average voltage of the DC voltage input example of FIG. 5, it is unlikely that the signals will normally have the same value or resolution.

The variance and standard deviation of both of the above input signals may further be calculated according to the following formulas:

$$\text{VARIANCE} = \sum_{i=1}^{15} \frac{(S_i - A_v)^2}{15}$$

$$\text{STANDARD DEVIATION} = \sqrt{\text{VARIANCE}}$$

Referring to the DC input signal of FIG. 5, it is seen that the variance is equal to zero. Therefore, the standard deviation must also be zero. Armed with this information, microcontrollers 58 and 80 are programmed to identify and process the input signal as a DC waveform.

Referring now to the PWM input signal of FIG. 6, it is seen that the variance and therefore the standard deviation of the signal is a non-zero value. Microcontrollers 58 and 80 are similarly programmed to identify and process the input waveform as a PWM signal based upon this information.

Attention is drawn to the fact that through the statistical analysis above, the control circuit of the present invention is programmed to distinguish and recognize DC and PWM input signals in the first instance. Significantly, the hardware utilized by the circuit is common to most applications and no additional installation procedures such as the activating or deactivating of trapping jumpers are generally required as in the prior art systems.

Regardless of the type of input waveform provided, DC offset voltages and variations in the pulse amplitude will still occur naturally and require adjustment. As well known by those skilled in the art, adjustments are necessary to provide a dimming signal having equal amplitude swings so as to consistently control the brightness of the dimming display with a recognizable dimming signal.

In the case of PWM signals, the signal level will therefore be adjusted by the software to a predetermined value when the pulse is in high cycle and lowered to zero volts when the pulse is in its low cycle. Similar adjustments may be required by the microcontroller software in the case of DC input signals.

While the best mode for carrying out the invention has been described in detail, those familiar with the art to which this invention relates will recognize alternative designs and embodiments for practicing the invention as defined by the following claims.

I claim:

1. A control circuit having a ground potential for receiving and distinguishing input signals on the lamp lines of an instrument panel dimming circuit in generating a common dimming signal to set the corresponding dimming level, comprising:

input means for coupling and stabilizing distinct input signals to a control circuit; and an analog-to-digital converter in electrical contact with said input means for statistically differentiating between said input signals to generate a common dimming signal;
said input means comprises an optoisolator in electrical contact with said lamp lines for isolating said input signals from said analog-to-digital converter, said optoisolator including a light emitting diode in electrical contact with said input signal.

2. A control circuit as in claim 1, further comprising an NPN transistor optically coupled to said input means through said light emitting diode.

3. A control circuit as in claim 1, wherein said input means further comprises:
voltage divider means in electrical contact with said lamp lines for receiving an input signal and generating a differential voltage between said lamp lines; and
amplifier means in electrical contact with said voltage divider means for receiving said differential voltage and generating an output signal using the ground potential of the control circuit as a reference.

4. A control circuit as in claim 3, further comprising protect means in electrical contact with amplifier means and said analog-to-digital converter for receiving said output signal and protecting said analog-to-digital converter from high voltage inputs.

5. A control circuit as in claim 4, wherein said protect means comprises a zener diode.

6. A control circuit as in claim 5, further comprising filter means in electrical contact with said amplifier means and said analog-to-digital converter for filtering noise on said output signal.

7. A control circuit as in claim 6, wherein said filter means comprises a capacitor.

8. A method for distinguishing selected input signals on the lamp lines of an instrument panel dimming circuit, having a ground potential and generating a common dimming signal to set the corresponding dimming level, comprising:
providing an analog-to-digital converter;
coupling said input signals to a control circuit;
generating an output signal corresponding to said distinguished input signals at said control circuit for receiving by said analog-to-digital converter;
statistically sampling said output signal with said analog-to-digital converter to determine the waveform of the distinguished input signals; and
adjusting the amplitude of said output signal according to said determined waveform through the use of a microcontroller software so as to provide a common dimming signal with equal amplitude swings in order to prevent of different pulse amplitudes and offset voltages.

* * * * *